Patented Feb. 21, 1933

1,898,358

UNITED STATES PATENT OFFICE

ROYAL W. GELDER, OF GREELEY, COLORADO

METHOD OF HARDENING LIME MORTAR

No Drawing.  Application filed January 10, 1929. Serial No. 331,725.

This invention relates to methods of treating building lime, such as slaked quick-lime, or hydrated lime, for use in mortar, plaster, stucco, and the like, to effect a general improvement in such lime base compositions.

A particular object of the present invention is to produce a lime-base mortar which is hard, strong, and of good adhesive qualities.

Another object is to produce a lime-base mortar which can be retempered without injury, and which does not set so quickly as to affect its workability.

A further object is to produce a lime-base mortar of high plasticity and smooth working quality.

Still another object is to provide a lime-base mortar which can be used at comparatively low temperatures without damage from frost.

A still further object is to provide methods of accomplishing the foregoing objects which are adaptable to both field and plant practice.

It is well known that ordinary lime mortars set and obtain their strength very slowly by the absorption of carbon dioxide from the air.

Since there can be little or no circulation of air except at or near the exposed surfaces of such mortar, unexposed lime mortar, such as a mortar joint in masonry construction not in contact with air, never becomes recarbonated so as to become very strong or hard.

Portland cement is commonly used with building lime in various proportions to produce a mortar which will set and harden to some extent out of contact with the air. Its use with lime, however, is productive of characteristics seriously adverse from the standpoint of workability, in the resultant mortars.

For example, lime-cement mortars set so rapidly that only small batches can be handled without retempering (reworking with water) and the work of pointing up, or scoring, in masonry construction must be done almost immediately. Moreover, retempering of lime cement mortar is conceded to be injurious to the same, and to offset much of the advantage in strength otherwise gained.

Portland cement also has the effect of producing harsh working mortars and of reducing the plasticity of lime mortar.

By my present method of treating building lime, I find that I can produce a strong and highly adhesive mortar which is even more plastic and smooth in working qualities than plain lime mortar. The mortars prepared in accordance with the principle of this invention are sufficiently slow-setting to present no difficulty in workability, while at the same time they gain strength rapidly after setting throughout the entire body of the mortar. Furthermore mortars made by my method may be safely used at a lower temperature than is customarily considered safe and are characterized by a rugged resistance to weather.

The present process may be considered as an adaptation of the reaction principle, disclosed in my co-pending application filed July 26, 1927, Serial No. 208,660, to building lime.

Such companion case was directed to the treatment of a limestone containing magnesium carbonate and calcium carbonate and of the calcined product of such limestones so as to produce magnesium oxide, magnesium sulphite, and calcium lime or hydrate, such product being mixed with a solution of magnesium chloride to form an oxychloride cement.

I now find that building lime, while not burned in accordance with the calcination practice disclosed in my said co-pending case, can be materially improved for use in mortar, plaster, and the like, by reacting magnesium sulphite and magnesium chloride therewith, and moreover, I find that such building lime need not necessarily contain magnesia to be benefitted by such reaction but that high calcium limes, containing no magnesia, are equally improved by my present treatment.

Since building lime is produced and marketed in two forms, namely, in the form of lump or quick-lime, and in the form of hydrated lime, a distinction is accordingly necessary as to the best methods of applying the invention.

Where it is desired to market the lime in treated form, the same will be prepared by the customary method of burning and hydrating to produce the commercial hydrated lime product.

To the hydrated lime product I then add seven per cent by weight of hexahydrate magnesium chloride ($MgCl_2 6H_2O$) and four per cent of weight of hexahydrate magnesium sulphite ($MgSO_3 6H_2O$) both in finely granular or pulverized form, and thoroughly intermix the same with the hydrated lime.

The lime, thus treated, is then sacked in moisture proof bags and is ready for market, and use, both in the customary manner of making mortar for masonry construction and for intermixture with plaster of Paris in the making of wall plaster compositions.

When quicklime is used the admixture of magnesium sulphite and magnesium chloride will be performed after the lime has been slaked. For this purpose a compound of the two hexahydrate magnesium salts mixed in the proportions of 63% magnesium chloride and 37% magnesium sulphite in pulverized or finely granular form, will be used and mixed with the slaked lime in the following proportions: 1 cu. ft. stiff lime putty, 4.75 pounds salt mixture or 80 lb. bushel quicklime slaked, 14 pounds of salt mixture or 180 lb. barrel quicklime slaked, 31.6 pounds of salt mixture.

When water is added to the admixture of magnesium chloride, and magnesium sulphite, with hydrated or slaked lime, the following reactions take place: $MgSO_3 + CaO + H_2O = Mg(OH)_2 + CaSO_3$, $MgCl_2 + CaO + H_2O = Mg(OH)_2 + CaCl_2$, and $MgSO_3 + CaCl_2 = MgCl_2 + CaSO_3$.

These reactions form magnesium hydroxide which reacts with magnesium chloride to form an oxychloride cement, and also form calcium sulphite, which apparently oxidizes on exposure to the air to gypsum.

While I have indicated what from tests I have found to be generally effective proportions of the salt admixtures, it is of course possible to vary the proportions without departing from the scope of this invention.

I find, furthermore, that it is possible to substitute other water soluble sulphites for magnesium sulphite, such as the alkali sulphites, and to substitute other alkali earth chlorides for magnesium chloride and thereby produce substantially the same reactions. For example, sodium sulphite reacts with calcium lime to produce calcium sulphite and when used with magnesium chloride will serve to harden the resultant mortars considerably.

As shown in the foregoing reactions calcium chloride will react with magnesium sulphite to produce calcium sulphite and magnesium chloride which will react to produce magnesium hydroxide as shown in the above equations.

In addition to hardening lime mortar, I find that the admixture of magnesium chloride and magnesium sulphite with lime and plaster of Paris mixtures, such as are used for wall plaster finish coats, is particularly effective. This is believed to be not only attributable to the effect of the admixture of the magnesium salts in hardening the lime, but also to the fact that plaster of Paris is appreciably soluble in magnesium chloride solutions. Moreover, it is believed that calcium sulphite crystals are effective in promoting crystal growth in the hydrated plaster of Paris.

These conclusions are based on the fact that the addition of only magnesium chloride serves to retard the setting and hardening of plaster of Paris with lime, whereas, magnesium sulphite serves to accelerate the setting and hardening. The joint effect of these magnesium salts admixed with the lime in the proportions described above, is to slightly retard the set of a lime-plaster of Paris mixture but to produce a much harder and stronger composition.

The retarding effect of the magnesium salt admixture upon lime and plaster of Paris mixtures is wholly desirable and advantageous, since it is the usual practice to use glue or other organic substances to retard crystal growth and hardening of the plaster.

I find that various proportions of lime, plaster of Paris, magnesium chloride, and magnesium sulphite may be used.

For interior wall plaster finish coat I find the following proportions produce a smooth working plaster of exceptional hardness and strength; and water resistent qualities: 50 parts plaster of Paris by weight, 50 parts hydrated lime by weight, 3½ parts of magnesium chloride ($MgCl_2 6H_2O$) by weight and 2 parts of magnesium sulphite ($MgSO_3 6H_2O$) by weight.

Sufficient water to produce the proper consistency. Or when slaked quicklime is used: 1 cubic foot of stiff lime putty, 44 pounds of plaster of Paris, 3 pounds of magnesium chloride crystal and 1¾ pounds of magnesium sulphite. Water to form proper consistency.

Having described my invention what I claim as new is:

1. A composition of matter formed by the admixture of magnesium chloride, magnesium sulphite, hydrated lime, and plaster of Paris.

2. A cementitious composition comprising, calcium hydrate, magnesium chloride, and magnesium sulphite.

In testimony whereof I affix my signature.

ROYAL W. GELDER.